March 15, 1960  D. SPENCER  2,928,225

HARVESTING MACHINE FOR FRUIT AND NUTS

Filed Nov. 10, 1958

INVENTOR.
DONNELL SPENCER,
BY
ATTORNEYS.

2,928,225

HARVESTING MACHINE FOR FRUIT AND NUTS

Donnell Spencer, Cincinnati, Ohio

Application November 10, 1958, Serial No. 772,843

4 Claims. (Cl. 56—328)

This invention relates to a harvesting machine for fruit and nuts. It is an object of this invention to provide a machine or apparatus which may be propelled over the ground, preferably by power means such as a tractor or the like, and which will pick up the fruit or nuts or other produce to be harvested and which will do this efficiently and without danger of jamming. It is another object of the invention to produce an apparatus as above outlined which will be extremely simple and yet efficient in operation and which will require a minimum of maintenance.

Still another object of the invention is the provision of a machine which can operate efficiently in very sandy soil; and therefore the provision of a machine especially adapted for harvesting tung nuts, which ordinarily grow in very sandy soil. The tung nuts, falling from the trees often are embedded in the sand, so that the harvesting of these nuts has proved a difficult problem.

These and other objects of the invention which I shall point out in more detail hereinafter or which will be apparent to one skilled in the art upon reading these specifications, I accomplish by that certain construction and arrangement of parts of which I shall now disclose an exemplary embodiment.

Reference is made to the drawings forming a part hereof and in which.

Briefly, in the practice of my invention, I provide a carriage adapted to be propelled over the ground to be harvested as by means of a tractor or the like. Mounted upon this carriage are a pair of drums disposed in spaced parallel relation, the height of the periphery of the drums above the ground being adjustable by means similar to those controlling the blade of a bulldozer. Each of the drums is provided with a plurality of radial fingers of such a length that they reach almost to the opposed drum as the drums rotate. The spacing of the fingers on the drums is such that when the drums are counterrotated, the fingers of the two drums interdigitate. As the drums are counterrotated, the nuts or fruit to be harvested are swept up between the two drums by the approaching and interdigitating fingers and lifted up between the two drums. Stripper fingers are provided to cause the fruit to be carried over one of the two drums and other stripper fingers are provided to strip the nuts from said last mentioned drum. The nuts then fall into a trough and are carried laterally by a screw conveyor or the like to a point where they may be subjected to cleaning, screening, or other operations, and be deposited in a trailer or the like towed by the tractor.

Figure 1:
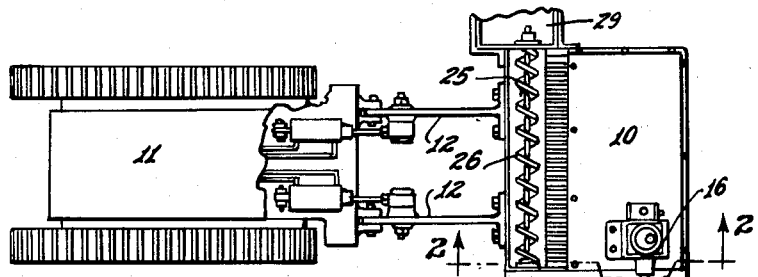
Figure 1 is a fragmentary plan view of a machine according to the present invention.

Referring in more detail to the drawings, the apparatus of the invention is indicated generally by the numeral 10 in Figure 1 and is adapted to be operated by means of a tractor or the like indicated diagrammatically at 11. It is connected to the tractor by means of the bars 12, which may be hydraulically operated to raise or lower the machine 10 with respect to the ground.

The apparatus 10 carries the drums 14 and 15. These drums are mounted upon shafts 14a and 15a and are arranged to be counterrotated by any desired means such as a small engine 16 through the chain sprocket drive indicated generally at 17 and the gears 18 and 19. The drums 14 and 15 are counterrotated in the direction of the arrows in Figure 2.

Figure 3:
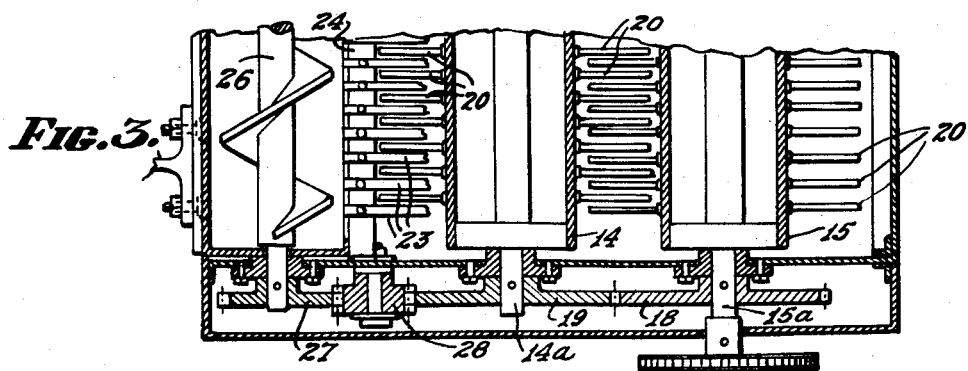
Figure 3 is a fragmentary cross-sectional view of the same taken on the line 3—3 of Figure 2.
Figure 4:
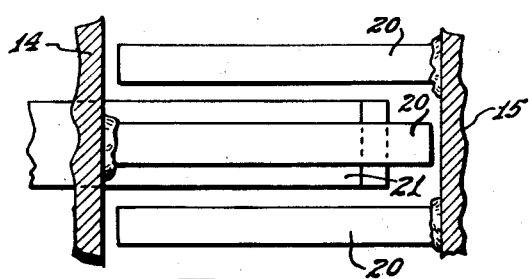
Figure 4 is a fragmentary cross-sectional view looking upward between the two drums.

Each drum carries a plurality of fingers 20. As best seen in Figure 3, the fingers 20 are arranged in axially spaced peripheral rows on each of the drums with the fingers on the drum 14 being displaced with respect to the fingers on the drum 15 so that they interdigitate. As clearly seen in Figure 3, by virtue of the position of the two drums and the length of the fingers 20, the fingers almost touch the opposed drum. Thus, nuts or the like are swept toward the left by the fingers on the drum 15 and toward the right by the fingers on the drum 14 and these fingers, as they rotate toward each other, pick the nuts up and carry them between the drums 14 and 15.

It will be understood that the height of the apparatus with respect to the ground may be adjusted by the operator, by raising or lowering the arms 12. If the ground is very sandy, the device may be positioned so that the fingers 20 dig into the sand to a depth of as much as three inches. The fingers 20 will dislodge the nuts from the sand and pick them up without picking up quantities of sand and without covering other nuts with sand before they are picked up.

At 21 there are indicated a number of arcuate stripper elements. These stripper elements 21 are disposed such that an element 21 extends just beyond the tips of the fingers 20 of each axially spaced row and these fingers extend over approximately a 90° arc so as to extend between or interdigitate with the fingers 20 of the drum 15. The elements 21 are secured to a cross member 22 in any desired manner.

Figure 2:
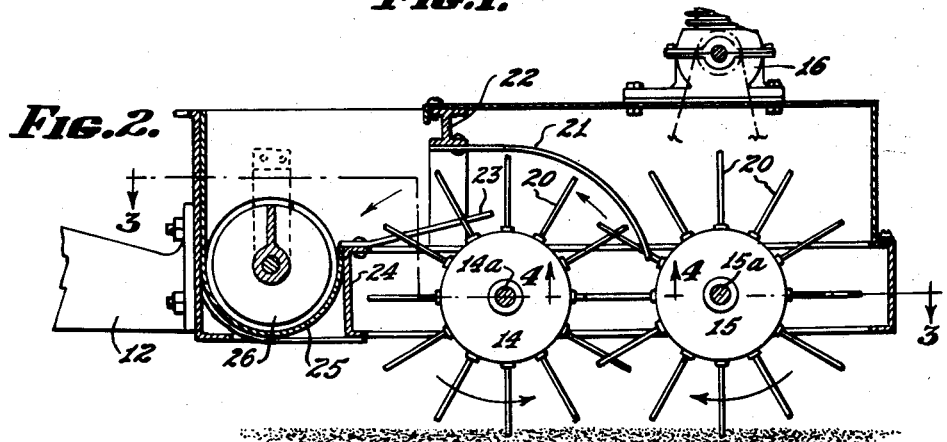
Figure 2 is a greatly enlarged cross-sectional view of the same taken on the line 2—2 of Figure 1.

As the fruit is elevated by the interdigitating fingers 20, it is stripped from the fingers 20 of the drum 15 and is caused to ride toward the left in Figure 2 over the drum 14.

At 23 I have indicated secondary stripper members secured to a frame element 24 and these are arranged to interdigitate with the fingers 20 on the drum 14 so that nuts which have been carried over the drum 14 are deposited on the strippers 23 which slope downwardly and away from the drum so that the nuts move in the direction of the arrow in Figure 2 and fall into the trough 25 within which operates the screw conveyor 26. The screw 26 may be driven through gearing 27, 28 from the gear 19. The nuts which have been deposited in the trough 25 are moved by the conveyor 26 to one side of the machine where provision may be made to screen them, or otherwise treat them before they are deposited in a suitable trailer. Such further treatment is not shown since it does not constitute a part of the present invention.

It will be clear that the various driven members may be driven from a power take-off on the tractor if desired and it is to be understood that the general configuration of the apparatus and the specific mounting on the tractor is by way of example only. Many modifications may be made without departing from the spirit of the invention and I, therefore, do not intend to limit myself except as set forth in the claims which follow.

Having now fully described my invention, what I claim as new and desire to secure by Letters Patent is:

1. In an apparatus for harvesting fruit and nuts, a frame adapted to be moved over the ground to be harvested, a pair of drums disposed on said frame with their axes parallel to each other and transverse with respect to the direction of movement of said frame, means operatively associated with said drums for counter-rotating said drums such that their mutually opposed surfaces move upwardly, a plurality of radial fingers on said drums of a length slightly less than the distance between the surface of said drums, the fingers of said two drums interdigitating with each other, whereby to pick up fruit and nuts from the ground and carry them upwardly between said drums, stripper means circumferentially disposed with respect to one of said drums and interdigitating with the fingers on the other of said drums to strip fruit and nuts from the other of said drums and cause them to be carried over said one of said drums, and secondary strippers interdigitating with the fingers on said one of said drums to strip the fruit and nuts from said one of said drums.

2. Apparatus according to claim 1, wherein a screw conveyor is provided on an axis parallel to the axes of said drums and behind said one of said drums, and the fruit and nuts are carried by said secondary strippers onto said screw conveyor.

3. An apparatus for harvesting fruit and nuts, comprising a frame adapted to be propelled over the ground to be harvested, a first drum rotatably mounted on said frame on an axis transverse to the direction of travel of said frame, said drum having radial fingers disposed in axially spaced circumferential rows, a second drum rotatably mounted in said frame parallel to said first drum, said second drum also having radial fingers disposed in axially spaced, circumferential rows, the fingers on said second drum being axially offset with respect to those on said first drum so as to interdigitate therewith, all the fingers on both said drums being of substantially the same length, which is slightly less than the distance between the peripheries of said drums, a series of arcuate strippers associated with said second drum, each of said strippers extending approximately over an arc of 90° from the top of said second drum toward said first drum, one stripper being aligned with each peripheral row of fingers on said second drum and disposed just beyond the ends of said fingers, and interdigitating between the rows of fingers of said first drum, a series of secondary strippers interdigitating with the circumferential rows of fingers on said second drum on the side thereof opposite said first drum, said secondary strippers extending from a point adjacent the periphery of said second drum at the top thereof downwardly and away from said drum, means operatively associated with said drums to counter-rotate said drums with said interdigitating fingers moving upwardly, and means for collecting the nuts stripped by said secondary strippers.

4. Apparatus according to claim 3, wherein said last named means comprise a screw conveyor disposed parallel to and behind said second drum, and said secondary strippers deliver said stripped nuts to said screw conveyor.

References Cited in the file of this patent

UNITED STATES PATENTS

| | | |
|---|---|---|
| 2,402,201 | Martin | June 18, 1946 |
| 2,508,454 | Goodwin | May 23, 1950 |
| 2,561,754 | Propheter | July 24, 1951 |